United States Patent [19]

Lessway

[11] Patent Number: 5,285,599
[45] Date of Patent: Feb. 15, 1994

[54] METHOD FOR ADJUSTING A STEADY REST HAVING AN INTERNAL CENTERLINE ADJUSTMENT

[75] Inventor: Richard J. Lessway, Farmington Hills, Mich.

[73] Assignee: Arobotech Systems, Inc., Madison Heights, Mich.

[21] Appl. No.: 53,406

[22] Filed: Apr. 28, 1993

Related U.S. Application Data

[62] Division of Ser. No. 830,666, Feb. 4, 1992, Pat. No. 5,237,780.

[51] Int. Cl.$^5$ .............................................. B24B 5/04
[52] U.S. Cl. .................................. 51/289 R; 82/164; 51/290
[58] Field of Search ............... 51/289 R, 290, 238 S, 51/238 GG; 82/164

[56] References Cited

U.S. PATENT DOCUMENTS

| | | | |
|---|---|---|---|
| 1,364,006 | 12/1920 | Swanson | 51/238 GG |
| 1,622,822 | 3/1927 | Cockburn | 51/238 S |
| 3,736,114 | 5/1973 | Okada | 82/164 |
| 3,967,414 | 7/1976 | Tamesui | 51/238 S |
| 4,324,073 | 4/1982 | Belthle | 51/238 S |
| 5,058,468 | 10/1991 | Lessway | 51/238 S |

*Primary Examiner*—Jack Lavinder
*Attorney, Agent, or Firm*—Robert G. Mentag

[57] ABSTRACT

A centering and supporting apparatus is disclosed for use as a true centering steady rest for rotatably supporting a cylindrical workpiece during a machining or grinding operation. The apparatus has an internal centerline adjustment mechanism for adjusting the steady rest so as to support the workpiece at its dynamic working centerline. At least one, or a pair of support arms are slidably mounted on an operator body in a housing. Said one or pair of support arms each carries a side workpiece contact member, and the operator body carries a center workpiece contact member, and each workpiece contact member is engagable with the perimeter of the workpiece. The operator body is moved by a stroking means to urge the center workpiece to support a workpiece. The support arms are urged to support the workpiece by the action of cam followers carried by the support arms, and which cam followers are each engaged with a camming contour disposed in a guide plate that is displaceable within the housing by the internal centerline adjustment mechanism. The internal centerline adjustment mechanism allows either one or a pair of guide plates to be shifted within the steady rest to accommodate any deviation which the dynamic working centerline imposes from the static centerline originally established prior to a machining or grinding operation.

3 Claims, 9 Drawing Sheets

METHOD FOR ADJUSTING A STEADY REST HAVING AN INTERNAL CENTERLINE ADJUSTMENT

This is a division of application Ser. No. 07/830,666 filed on Feb. 4, 1992 now U.S. Pat. No. 5,237,780.

BACKGROUND OF THE INVENTION

1. Field of the Invention

The present invention generally relates to steady rests employed to rotatably support a cylindrical workpiece while undergoing a precision machining or grinding operation. More specifically, this invention relates to a multi-point true centering steady rest having an internal centerline adjustment mechanism that enables the steady rest to more precisely support a rotating cylindrical workpiece at its dynamic working center during a machining or precision grinding operation.

2. Description of the Prior Art

Steady rests are commonly used in manufacturing to support rotatable cylindrical workpieces during machining or grinding operations. A steady rest provides an accurate positioning of a cylindrical workpiece relative to a grinding wheel or a cutting tool while allowing the workpiece to rotate. In addition, a steady rest serves two important functions. The first function is to prevent deflection of a rotating cylindrical workpiece at the point of grinding or a cutting operation thereon, a condition which becomes more likely as the length of the cylindrical workpiece increases. The second function is to provide a stabilizing effect on a rotating cylindrical workpiece to improve the precision and uniformity of a machining or grinding operation on the workpiece. Accordingly, the use of a steady rest or similar device is essential for accurately and precisely machining or grinding rotating cylindrical workpieces.

Steady rests which exemplify the state of the art are disclosed in U.S. Pat. Nos. 4,399,639, 4,647,097, 4,650,237 and 5,508,468 to Lessway, all of which are assigned to the assignee of the present invention. The above steady rests and others known in the prior art generally have at least two points of contact for supporting a workpiece around its perimeter. A steady rest having three support arms, such as that disclosed in U.S. Pat. No. 5,058,468 to Lessway, is particularly desirable for its ability to accurately support a workpiece through its longitudinal axis, or centerline.

The steady rest disclosed in U.S. Pat. No. 5,058,468 achieves a three-point centering and supporting action in the following manner. The supporting action is provided by a center workpiece contact member and a pair of support arms, each having a side workpiece contact member. The support arms are operatively attached to an operator body slidably mounted within a housing. The center workpiece contact member is disposed on one end of the operator body, adjacent and between the support arms. The supporting action of the support arms may be produced by a combination of rollers and fixed guide pins, or by flat guides, which selectively follow a pair of camming contours in the housing walls, as described in said U.S. Pat. No. 5,058,468. As the operator body is moved within the housing toward a workpiece, the support arms first move parallel with the longitudinal axis of the operator body. Once alongside the workpiece, the support arms, in cooperation with the camming contours, move laterally to converge upon the workpiece in a manner which operatively provides a centering and supporting engagement with the workpiece.

The demands of current and future manufacturing and machining technologies have resulted in many applications requiring higher degrees of precision than ever before, with tolerances on such items as camshafts, crankshafts and turbine shafts approaching as little as 1 micron (0.000039 inches). Whereas prior art steady rests have performed very well under typical circumstances, dynamic and transient conditions associated with turning and grinding operations have prevented these steady rests from being used for higher manufacturing tolerances without time consuming adjustments.

As an example, a typical manufacturing procedure is to use a master setup bar to establish what is termed the static centerline for a cylindrical workpiece. The static centerline serves to establish the axis of the workpiece to which the machine and workpiece are originally set for the desired operation. The steady rest is then secured to the machine in a position that will support the workpiece through its static centerline. Thereafter, the workpiece is ground or turned until, according to the original settings, the desired diameter is obtained. The workpiece is then removed and the diameter checked with an off-line gauge. Under standard tolerance conditions, the ability of the steady rest to stabilize and accurately support the workpiece relative to the grinding wheel, or tool, would be sufficient to achieve the desired diameter or the workpiece. However, where tolerances demand greater precision, the desired diameter may not be obtained, requiring the workpiece to be either scrapped (if undersized) or reworked (if oversized).

The cause for the oversize or undersize condition is two-fold. First, the workpiece experiences a dynamic shift in its centerline as a result of rotational forces and transient thermal conditions as the room, machine, grinding wheel or tool, and workpiece reach their respective steady-state temperatures. The resultant centerline is referred to as the dynamic centerline of the workpiece. Secondly, the workpiece's centerline undergoes a dynamic shift caused by the force applied by the grinding wheel, or tool, to the workpiece during the actual grinding or machining operation. This resultant centerline is referred to as the dynamic working centerline. The degree of departure from the dynamic centerline is not readily predictable, in that it is influenced by such diverse factors as the lubricity of coolants used, the grinding wheel dress condition, different grit sizes in the grinding wheel, and the material of the grinding wheel, or the sharpness of the cutting tool.

As a result, the dynamic working centerline may be sufficiently displaced from the initially set static centerline, such that the diameter of the workpiece is not within the tolerance band required. Regardless of whether an oversize or undersize condition results, an adjustment in the position of the steady rest, relative to the workpiece, must be made in an effort to seek the dynamic working centerline of the workpiece. Heretofore, it has been necessary to physically move the steady rest, by loosening its mounting bolts, then repositioning the steady rest using dial indicators to gauge the repositioning of the steady rest relative to the grinding wheel or cutting tool. Such a task is time consuming and not always sufficiently accurate to correct for the oversize or undersize condition. Accordingly, the above procedure must typically be repeated until the dynamic working centerline has been found.

As can be appreciated from the above, it would be desirable to incorporate within the steady rest a mechanism for adjustment, such that the steady rest could be displaced relative to the workpiece, without the need for the steady rest to be loosened and physically repositioned. The steady rest designs noted above are limited in that the action of the support arms is defined by camming contours which are formed in the interior walls of the steady rest housing. Because the interior walls of the prior art steady rest housings are stationary, such steady rests are limited to an external adjustment means for repositioning their housings. Such an external adjustment means would be undesirable from the standpoint of precision in making fine adjustments.

Accordingly, what is needed is a steady rest having an internal centerline adjustment mechanism for adjusting the action of the steady rest support arms, and which adjustment mechanism is capable of making fine adjustments relative to a workpiece. It would be additionally desirable if the internal adjustment mechanism could be capable of selectively operating on each support arm independently, to accommodate any eccentric shift of a workpiece relative to the steady rest and the grinding wheel, or cutting tool.

SUMMARY OF THE INVENTION

In accordance with the present invention there is provided a steady rest which is provided with an internal centerline adjustment mechanism that displaces at least one guide member, or a pair of guide members in which are formed steady rest support arm camming means. The camming means guide the steady rest support arm or arms, and they are displaced or shifted relative to a workpiece, to accommodate a shift in the workpiece's dynamic working centerline. The steady rest itself does not need to be repositioned. The adjustment can be made from the exterior of the steady rest through any suitable means, such as an adjustment screw so as to provide an adjustment ratio which allows for a controlled displacement of the support arms of as little as 0.00008 inches or less.

The steady rest of the present invention consists of a housing having a longitudinal axis. The housing has a working end, at one end of its longitudinal axis, such that the working end is positioned adjacent the workpiece when the steady rest is mounted to a grinding machine or lathe. In one embodiment of the invention a pair of guide members are disposed within the housing in spaced-apart relation to each other. The guide members are each slidable within the housing in a longitudinal direction parallel to the housings longitudinal axis. A camming means or camming contour is formed in each of the guide members. The adjustment mechanism is mechanically connected to each of the guide members such that adjustment through the adjustment mechanism produces displacement of the guide members, and thus the camming means, in the longitudinal direction.

An operator body is disposed within the housing and between the guide members. The operator body is slidable in the longitudinal direction adjacent to the camming means in the guide members. A center workpiece contact member is mounted at one end of the operator body adjacent the housing's working end, forming one of the three workpiece contact members of the steady rest. A pair of support arms are operatively associated with the operator body. Each of the support arms has a sliding end and a supporting end, the sliding end being slidably engaged with the operator body while the supporting end projects longitudinally from the working end of the housing. In addition, a side workpiece contact member is mounted at each supporting end for providing the second and third workpiece contact members which form a three-point contact with the periphery of a workpiece. A roller member and a pair of fixed guide pins are attached to each support arm and they selectively engage a corresponding one of the camming means formed in the guide members. Each of the camming means has a longitudinal portion and a narrower transverse portion. The roller members provide low friction camming action between the pair of support arms and the transverse portion of their corresponding pair of camming means. The fixed guide pins slidably engage the longitudinal portions of the camming means.

During normal operation, the operator body is longitudinally stroked, preferably by an electrical or fluid actuated power source, between the guide members, such that the roller members and guide pins on each support arm are forcibly cammed by their respective camming means. One complete cycle of the operator body consists of an extension stroke and a retraction stroke. During the extension stroke, each pair of fixed guide pins traverse a longitudinal portion of its camming means to provide longitudinal extension of the center workpiece contact member and the support arms toward the workpiece. Once the longitudinal portion of the camming means has been traversed, each roller member traverses a transverse portion of its camming means which provides for further longitudinal extension of the center workpiece contact member while simultaneously converging the side workpiece contact members of the support arms. On the retraction stroke, each of the roller members and each pair of fixed guide pins follow their respective camming means in a reverse manner to return the support arms and operator body to their original positions.

When it is determined that the steady rest is not properly positioned to establish the dynamic working centerline of a workpiece, the adjustment mechanism can be used to displace the guide members either towards or away from the workpiece, depending upon whether an oversize or undersize condition exists, respectively. By shifting the guide members with their corresponding camming means, the point at which the support arms begin to converge upon the workpiece can be delayed or advanced as necessary. A graduation feature is provided with the adjustment mechanism such that the guide members can be accurately repositioned within the housing to ensure that the motion of the center and side workpiece contact members toward the workpiece attains, or at minimum is significantly closer to, the dynamic working centerline of the workpiece. As a result, a more precise three-point true centering contact with the workpiece is achieved. In one embodiment of the invention a two-point true centering contact with a workpiece is achieved by the use of only one guide member and one support arm.

A significant advantage of the present invention is that adjustments can be made to the steady rest to accommodate the dynamic working centerline of the workpiece without resorting to loosening and physically repositioning the steady rest relative to the grinding machine or lathe. As a result, significant downtime required to adjust and remeasure the steady rest's position is avoided. The adjustment can be made entirely within the steady rest's housing without any repositioning of the steady rest itself.

Another benefit is that the adjustment mechanism can be calibrated to provide minute and controlled adjustments relative to the workpiece. By measuring the diameter of the first workpiece, an adjustment can be made that corresponds very accurately to the error by which the first workpiece was produced. In cooperation with the automatic centering capability of the present invention, manufacturing tolerances can be more readily achieved with reduced downtime and scrap rates.

Accordingly, it is an object of the present invention to provide a steady rest with an internal centerline adjustment mechanism which allows the steady rest to be adjusted to support a workpiece at its dynamic working centerline during a machining or grinding operation.

It is a further object of this invention that such an aforedescribed adjustment mechanism be capable off providing minute and accurate adjustments to the steady rest to reduce the amount of repetitive attempts to locate the dynamic working centerline of the workpiece.

It is a still further object of this invention that such an aforedescribed adjustment mechanism be adaptable to provide independent adjustment of each support arm, such that offset adjustments can be made to the supporting action of the support arms.

Other objects and advantages of this invention will be more apparent after a reading of the following detailed description taken in conjunction with the drawings provided.

DETAILED DESCRIPTION OF THE PREFERRED EMBODIMENTS

Figure 1:
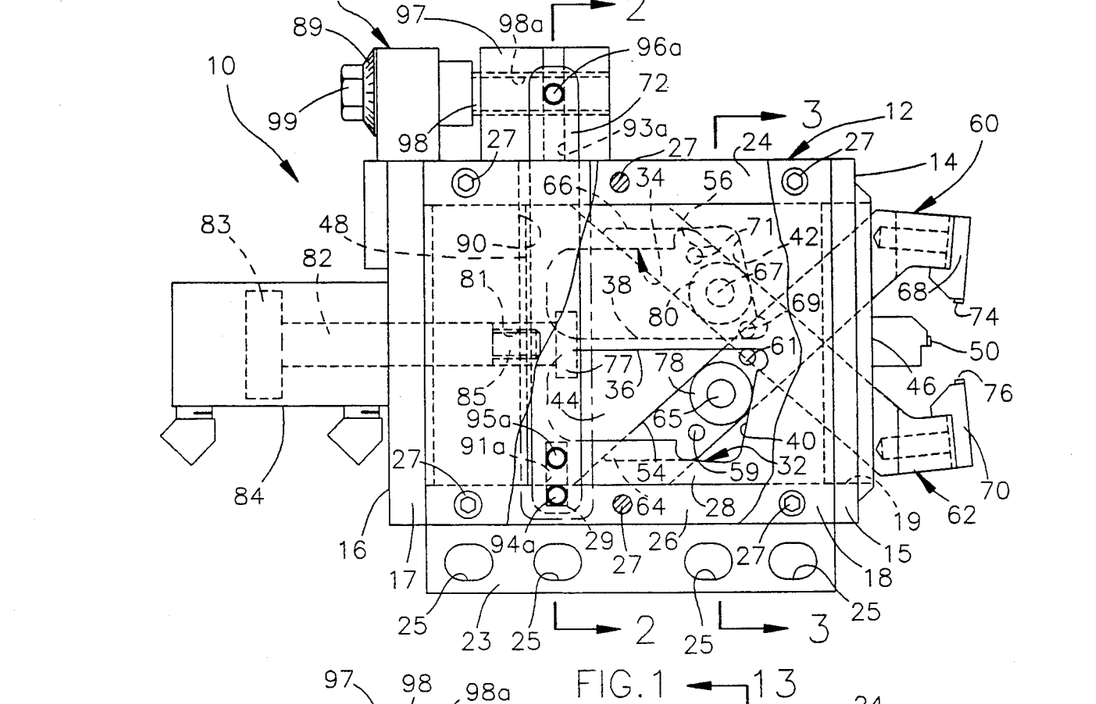
FIG. 1 is a front elevation view, with parts in section and parts broken away of a steady rest having an internal centerline adjustment mechanism in accordance with a preferred embodiment of the invention.

FIG. 1 illustrates a first embodiment, generally indicated by the numeral 10, of a steady rest made in accordance with the present invention. The steady rest 10 consists of a housing, generally indicated by the numeral 12, having a longitudinal axis, a working end 14 formed by a wiper member 15 at one end of the longitudinal axis, and a remote end 16 formed by a rear wall 17 at the other end of the longitudinal axis. As can be seen in the cross section view of FIGS. 2 and 3, the housing 12 has a first or right side wall 18, (viewed from the remote end 16), and an opposing second or left side wall 20, both of which are parallel to each other and to the plane of the longitudinal axis. A top wall 24 and a bottom wall 26, in conjunction with the first and second side walls 18 and 20, form the contiguous four-sided enclosure or housing 12. As shown in FIGS. 1-3, 5 and 12, the bottom wall 26 has an integral mounting flange 23 on the bottom side thereof, which is provided with a plurality of mounting bolt holes 25. The housing walls 17, 18, 20, 24 and 26 are releasably secured together by suitable machine screws, such as the machine screws 27 illustrated in FIGS. 1 and 5.

Figure 3:
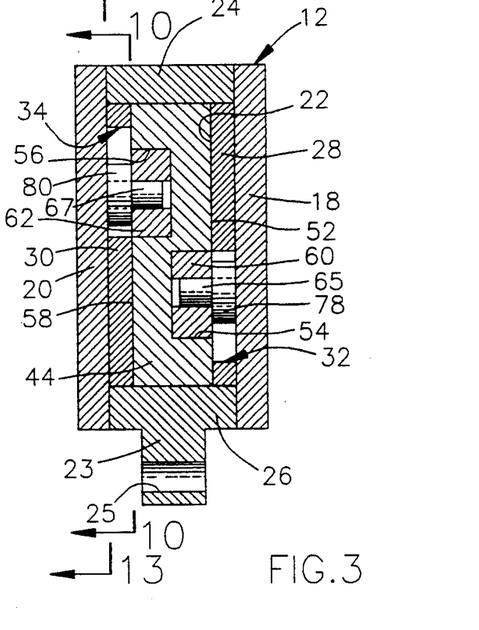
FIG. 3 is a cross section view of FIG. 1, taken along the line 3—3 thereof, and looking in the direction of the arrows.
Figure 10:
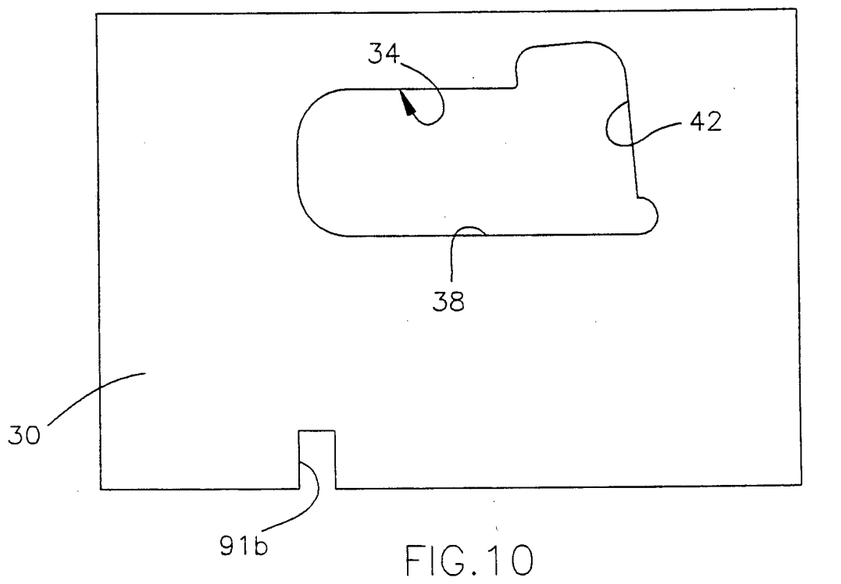
FIG. 10 is an interior, side elevation view of the left hand guide plate employed in the invention, taken along the line 10—10 of FIG. 3, and looking in the direction of the arrows.

With further reference to FIG. 3, a first and second guide plate 28 and 30 are slidably mounted on the inner sides of the first and second side walls 18 and 20, respectively, of the housing 12. As seen in profile in FIG. 3, and as a plan view in FIG. 1, a first camming contour, generally indicated by the numeral 32, and an oppositely disposed second camming contour, generally indicated by the numeral 34, is formed in the first and second guide plate 28 and 30 (FIG. 10) respectively. As best seen in FIG. 1, each of the camming contours 32 and 34 has a longitudinal portion 36 and 38, and a transverse portion 40 and 42, respectively, which extend in opposite directions away from the longitudinal axis. For manufacturing purposes it is desirable to make the first (right) and second (left) guide plates 28 and 30 identical as shown such that, when mounted within the housing 12, the first and second camming contours 32 and 34 are reverse images of each other, on opposite sides (vertically, as viewed in FIG. 1) of the longitudinal axis.

Figure 2:
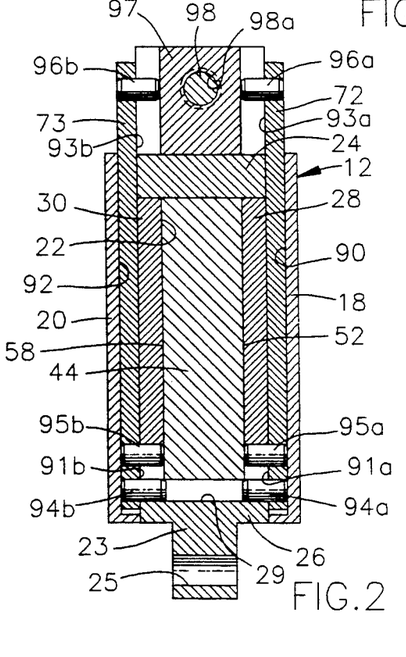
FIG. 2 is a cross section view of FIG. 1, taken along the line 2—2 thereof, and looking in the direction of the arrows.
Figure 11:
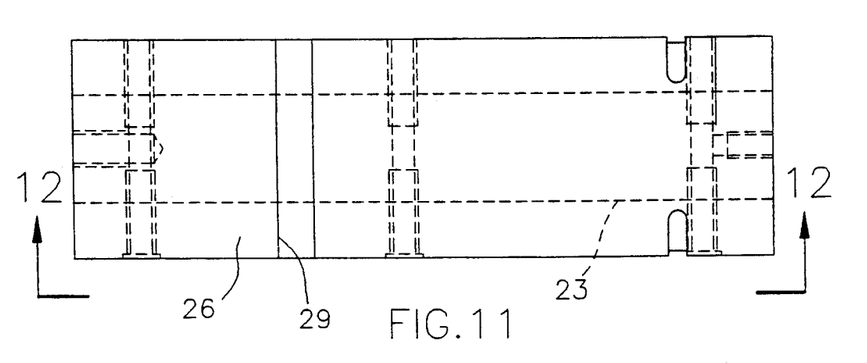
FIG. 11 is a top plan view of the housing bottom wall.
Figure 12:
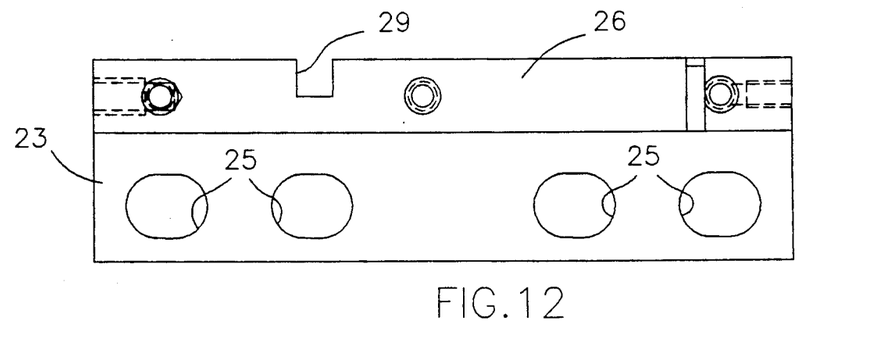
FIG. 12 is a side elevation view of the bottom wall illustrated in FIG. 11, taken along the line 12—12 thereof, and looking in the direction of the arrows.
Figure 13:
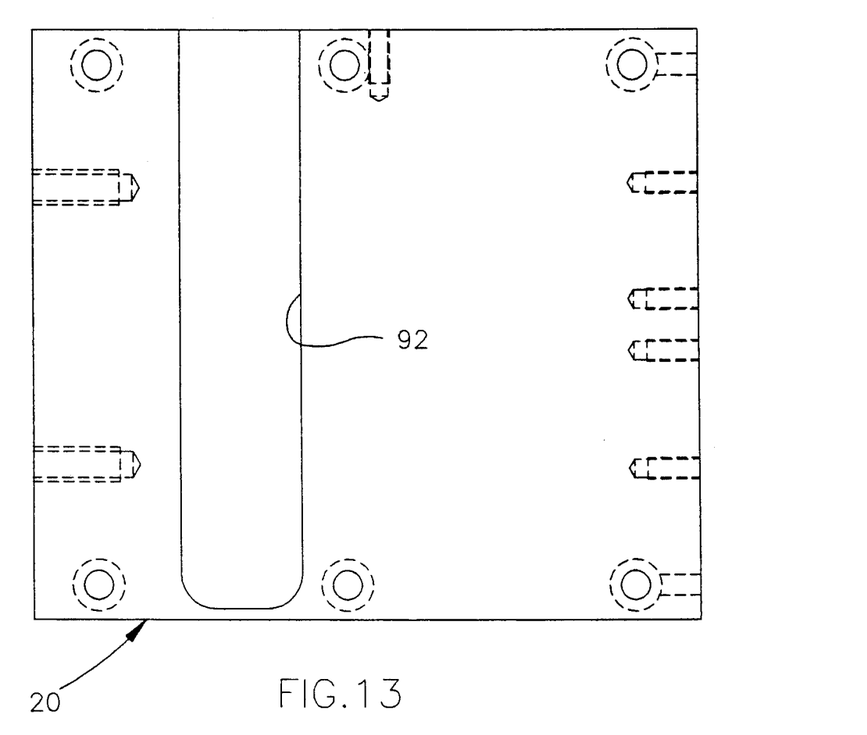
FIG. 13 is a interior, side elevation view of the left side plate, taken along the line 13—13 of FIG. 3, and looking in the direction of the arrows.
Figure 14:
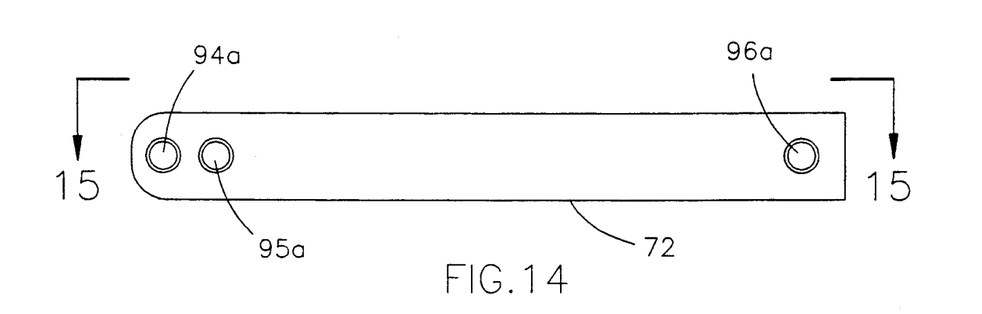
FIG. 14 is a plan view of the outer side of one of the adjustment control arms or rods employed in the invention.
Figure 15:
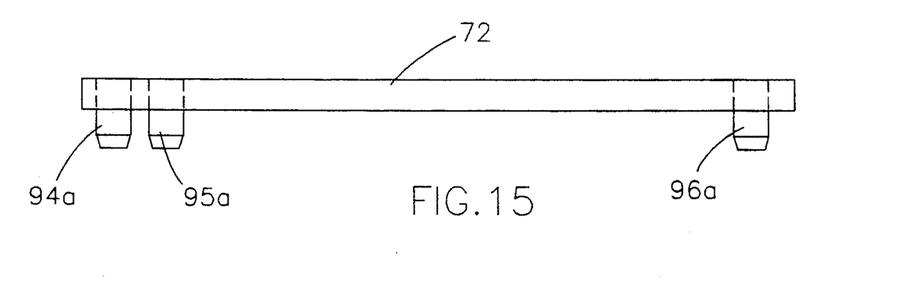
FIG. 15 is a side view of the adjustment control arm illustrated in FIG. 14, taken along the line 15—15 thereof, and looking in the direction of the arrows.

With reference now to FIGS. 1, 2 and 13, a pair of vertical, transverse slots 90 and 92 (as viewed in FIG. 2) are formed on the interior surfaces of the first and second side walls 18 and 20. Pivotally mounted within the slots 90 and 92 are a pair of identical control arms or rods 72 and 73, respectively. Control arm 72 is shown in detail in FIGS. 14 and 15. The control arms 72 and 73 are each provided with a lower pivot pin 94a and 94b, respectively, which are fixed to their respective control arms 72 and 73, as by a press fit in a suitable bore in said arms. As best seen in FIGS. 2, 11 and 12, the housing bottom wall 26 is formed with a transverse pivot slot 29 for the pivotal seating of the control arm lower pivot pins 94a and 94b. A pair of adjustment pins 95a and 95b are fixedly mounted on the lower ends of the control arms 72 and 73, respectively, in positions slightly above the lower pivot pins 94a and 94b, and they are slidably mounted in a pair of corresponding abutment pin slots (FIGS. 2, 10) 91a and 91b formed at the lower edges of the guide plates 28 and 30, respectively. At their upper ends, the control arms 72 and 73 have fixedly attached thereto a pair of upper pivot pins 96a and 96b, respectively, which are slidably mounted in a pair of vertical slots 93a and 93b (as viewed in FIG. 2) which are formed on opposite sides of an adjustment block 97.

Figure 5:
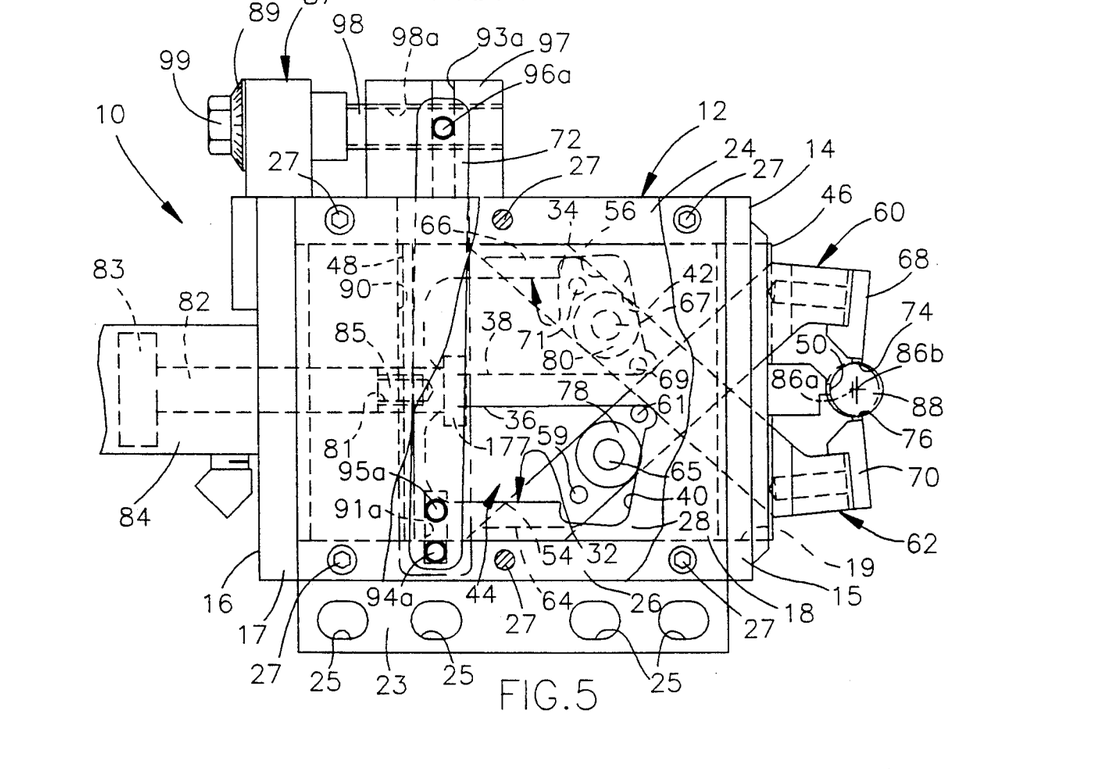
FIG. 5 is a front elevation view of the steady rest of FIG. 1, and wherein an adjustment has been made to accommodate the dynamic working centerline of a workpiece.
Figure 6:
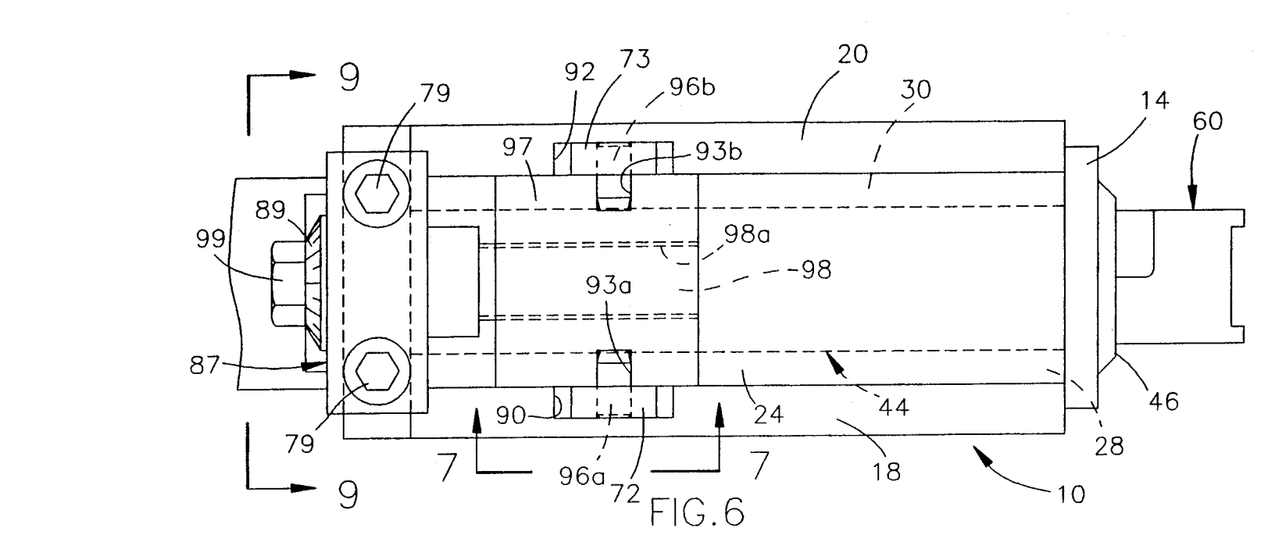
FIG. 6 is a top plan view of the steady rest illustrated in FIG. 1, and with parts broken away.
Figure 7:
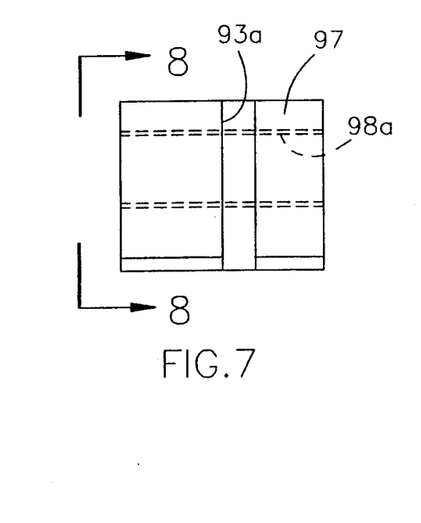
FIG. 7 is an elevation view of the adjustment block shown in FIG. 6, taken along the line 7—7 thereof, and looking in the direction of the arrows.
Figures 8, 9:
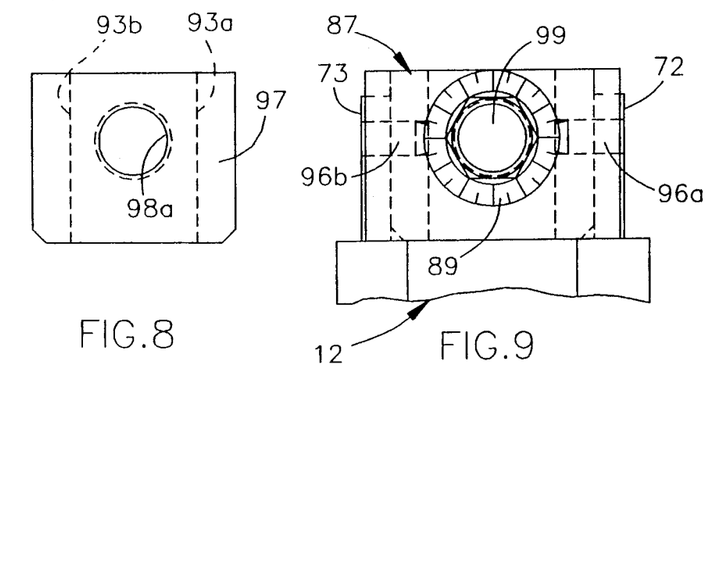
FIG. 8 is an elevation view of the adjustment block as illustrated in FIG. 7, taken along the line 8—8 thereof, and looking in the direction of the arrows.
FIG. 9 is a left side elevation view of the steady rest structure shown in FIG. 6, taken along the line 9—9 thereof, looking in the direction of the arrows, and showing the adjustment knob of the micro-feed adjuster apparatus.

The adjustment block 97 is slidably mounted on the upper side of the housing top wall 24, and it is adjusted forwardly and backwardly by a left handed adjustment screw 98 which is threadably mounted in a threaded bore 98a in the adjustment block 97. The adjustment screw 98 comprises a part of a conventional micro-feed adjuster apparatus, designated generally by the numeral 87, in FIGS. 1, 5 and 6, and available from the E & E Engineering Company of 11941 Harper Avenue, Detroit, Mich. The micro-feed adjuster apparatus 87 is releasably secured to the top wall 24 by any suitable means, as by a pair of suitable machine screws 79 (FIG. 6). The adjustment screw 98 functions to slide the adjustment block 97 forwardly or backwardly, which causes the control arms 72 and 73 to be pivoted about the lower pivot pins 94a and 94b, which are pivotally seated in the transverse slot 29 in the upper side of the bottom wall 26 (FIG. 2). The upper pivot pins 96a and 96b on the upper end of the control arms pivot and slide axially in the adjustment block slots 93a and 93b, respectively. The adjustment pins 95a and 95b pivot and slide in the slots 91a and 91b, respectively, in the guide plates 28 and 30, respectively, and shift the guide plates 28 and 30 under the control of the micro-feed adjuster apparatus 87.

In a preferred embodiment, the ratio of the lengths between the upper pivot pins 96a and 96b, and the lower pivot pins 94a and 94b, and between the adjustment pins 95a and 95b, and the lower pivot pins 94a and 94b, is approximately 12:1. The ratio acts to reduce the effect of any adjustment made at the adjustment screw 98 by a factor of 12. Accordingly, a linear adjustment of 0.012 inches by the adjustment screw 98 will produce a linear displacement of the guide plates 28 and 30 of approximately 0.001 inches. To provide a reference from which adjustments can be made, the micro-feed adjuster 87 includes an adjustment head or control knob 99 which has graduations 89 for gauging the adjustment produced at the guide plates 28 and 30 by the rotation of the adjustment screw 98. The graduations 89 are preferably demarcated to provide an incremental adjustment capability of 2 microns, or 0.00008 inches, at the guide plates 28 and 30. The preferred 12:1 ratio is noted here as only a preferred ratio. Those skilled in the art will readily observe that different ratios can be used without altering the teachings or operation of the disclosed invention.

The first and second guide plates 28 and 30 together define a cavity 22 (FIGS. 2, 3) within the housing 12. Disposed within the cavity 22 is an operator body 44. The operator body 44 is longitudinally slidable between a retracted position adjacent the housing rear wall 17 and an extended position through an opening 19 in the wiper member 15 on the working end 14. The operator body 44 remains between the first and second guide plates 28 and 30 throughout a complete cycle which consists of one extension and one retraction stroke. The operator body 44 has a contact end 46 (FIG. 4) adjacent the working end 14 of the housing 12 (FIG. 5), and an actuation end 48 adjacent the remote end 15 of the housing 12. Centrally located on the contact end 46 of the operator body 44 is a center workpiece contact member 50.

Figure 4:
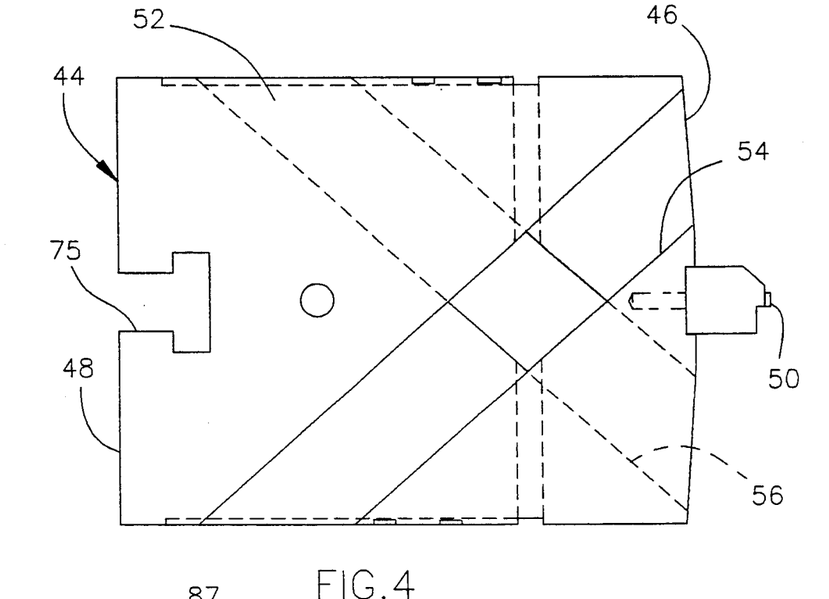
FIG. 4 is a front elevation view of the operator body in accordance with a preferred embodiment of the invention.

As more clearly seen in FIG. 4, there are first and second grooves 54 and 56 formed on first and second opposite side surfaces 52 and 58, respectively, (FIGS. 2, 3) of the operator body 44. As seen in FIG. 3, the first groove 54 is formed to be adjacent and facing the first camming contour 32 of the first guide plate 28, while the second groove 56 is formed to be adjacent and facing the second camming contour 34 of the second guide plate 30. As best seen in FIGS. 4 and 5, the grooves 54 and 56 extend obliquely across the operator body surfaces 52 and 58, respectively, relative to the longitudinal axis, and in a criss-cross pattern relative to each other. Each groove 54 and 56 terminates at one end of the operator body 44, on opposite sides of the center workpiece contact member 50, at the contact end 46 of the operator body 44. The grooves 54 and 56 terminate at their respective other end adjacent the housing bottom wall 26 and top wall 24, respectively.

Referring again to FIGS. 1 and 3, slidably residing within each groove 54 and 56 is a first support arm 60 and a second support arm 62, respectively, which together perform the task of supporting a workpiece (reference number 88 in FIG. 5) on either side of the center workpiece contact member 50. Each support arm 60 and 62 has a sliding end 64 and 66, and an oppositely disposed supporting end 68 and 70, respectively. The sliding ends 64 and 66 slidably engage their respective groove 54 and 56, while the supporting ends 68 and 70 extend from their respective grooves 54 and 56, on opposite sides of the center workpiece contact member 50, such that they extend longitudinally from the working end 14 of the housing 12. Disposed on each of the supporting ends 68 and 70 is a side workpiece contact member 74 and 76, respectively, which together with the center workpiece contact member 50 form a three-point contact with the workpiece 88 (FIG. 5). It has been found that a very hard, low friction material is best suited for use as the center and side workpiece contact members 50, 74 and 76, respectively. The low friction characteristic of such a material improves the sensitivity of the steady rest 10 in regard to the position of the workpiece 88 (FIG. 5), while the hardness characteristic makes for a more durable and reliable workpiece contact. A particularly well-suited material for purposes of the present invention is a commercially available polycrystalline diamond material.

A first and second cam roller 78 and 80 (FIGS. 1, 3), are rotatably attached to the first and second support arms 60 and 62, adjacent the first and second sliding ends 64 and 66, respectively. The cam rollers 78 and 80 are rotatably attached to the support arms 60 and 62 by suitable dowel pins 65 and 67, respectively, which have one end press fitted in the support arms 60 and 62, and the other end rotatably supporting the cam rollers 78 and 80. The first and second cam rollers 78 and 80 each engage its respective transverse portion 40 and 42 of the camming contours 32 and 34, respectively, providing low friction camming between the first and second support arms 60 and 62 and the transverse portions 40 and 42 of the first and second camming contours 32 and 34.

FIGS. 1 and 5 show how the cam rollers 78 and 80 cooperate with a first and second pair of fixed guide pins 59,61 and 69,71. The fixed guide pins 59 and 71 slidably engage the outboard sides of the longitudinal camming contour portions 36 and 38, respectively. The fixed guide pins 61 and 69 slidably engage the inboard sides of the longitudinal camming contour portions 36 and 38, respectively. The rolling action of the cam rollers 78 and 80 is most crucial, necessitated by a need for maximum sensitivity of the operator body 44 during rolling on the transverse portions 40 and 42 in the extension stroke, when the side workpiece contact members 74 and 76 are converging with the center workpiece contact member 50 towards the workpiece 88. Additionally, the rolling action of the cam rollers 78 and 80 is crucial when the side workpiece contact members 74 and 76 and the center workpiece contact member 50 are following down the workpiece 88, as its diameter is reduced during a machining or grinding operation. It has been found that the support arms 60 and 62 will better clear the workpiece 88 during a retraction stroke if they are guided through the longitudinal portions 36 and 38 of the camming contours 32 and 34 by the guide pins 59,61 and 69,71. Consequently, the cam rollers 78 and 80 coact with the camming contours 32 and 34 when traversing the upper side of the transverse camming contour portions 40 and 42. The remainder of the extension and retraction strokes are guided by the fixed guide pins 59,61 and 69,71 sliding in the longitudinal camming contour portions 36 and 38 of the camming contours 32 and 34, respectively.

For purposes of displacing the operator body 44, and thus the support arms 60 and 62, longitudinally within the housing 12, there is provided a stroking device 84 (FIG. 1) mounted on the remote end 16 of the housing 12. In the preferred embodiment, the stroking device 84 is a hydraulic actuator which strokes the operator body 44 through hydraulic forces acting upon a piston 83 and piston rod 82 assembly. The piston 83 is mechanically connected to the operator body 44, by male threads 85 formed on the outer end of the piston rod 82, which mate with female threads 81 formed in a T-nut 77 that is seated in a T-shaped socket 75 (FIG. 4) formed in the actuation end 48 of the operator body 44. Alternatively, the stroking device 84 may be actuated by either an electrical actuator or a compressed air actuator. By example, compressed air will be readily available under most manufacturing conditions, and is suitable for the present invention. However, in practice, it has been found that hydraulic actuation of the stroking device 84 is generally preferred. The operator body 44 may also be stroked manually through its operative movements, as for example, by a hand crank and screw, as employed in a fourth embodiment described in detail in FIGS. 23 and 24 hereinafter.

In operation, the stroking device 84 provides an extension stroke to the operator body 44. During the extension stroke, the first and second cam rollers 78 and 80 each move through their respective camming contour longitudinal portions 36 and 38 of the camming contours 32 and 34, in a non-engaging relationship, but with the fixed guide pins 59,61, and 69,71 slidably engaging the longitudinal camming contour portions 36 and 38, to provide longitudinal extension of both the center workpiece contact member 50 and the first and second support arms 60 and 62 toward the workpiece 88. While the first and second cam rollers 78 and 80 are non-operative in the camming contour longitudinal portions 36 and 38, their respective first and second support arm sliding ends 64 and 66 remain substantially stationary within the operator body 44.

Once the first and second cam rollers 78 and 80 have moved through their respective camming contour longitudinal portions 36 and 38, further stroking of the operator body 44 urges the first and second cam rollers 78 and 80 to roll on the right end surface (as viewed in FIGS. 1 and 5) of their respective first and second camming contour transverse portions 40 and 42 for the remainder of the extension stroke. During this segment of the extension stroke, the support arm first and second sliding portions or ends 64 and 66 are forced to slide within their respective grooves 54 and 56, respectively, in a substantially lateral outward direction, away from the longitudinal axis and each other. The divergence of the support arm sliding ends 64 and 66 produces a convergence at the support ends 68 and 70. At the same time, the operator body 44 continues to be displaced longitudinally toward the workpiece 88, providing further longitudinal extension of the center workpiece contact member 50. The combined motion of the extension of the center workpiece contact member 50, with the convergence of the side workpiece contact members 74 and 76, provides for a three-point centering engagement with the workpiece 88. During the retraction stroke, the first and second cam rollers 78 and 80, together with their respective set of fixed guide pins 59,61 and 69,71, respectively, follow their respective first and second camming contours 32 and 34 in a sequentially reverse manner, backing off the center and side workpiece contact members 50, 74 and 76 from the workpiece 88. The co-action of the rollers 78 and 80, and the fixed guide pins 59,61 and 69,71 with the camming contours 32 and 34 is described in more detail in the Lessway U.S. Pat. No. 5,058,468, and such description and operation of the operator body 44, and the workpiece contact members 50, 74 and 76 as set forth in said patent are incorporated herein by reference.

A typical procedure in which the steady rest 10 of the present invention is employed is set forth hereinafter with reference to FIG. 5. Conventionally, a master setup bar (not shown) is used to establish the static centerline 86a of the workpiece 88. The static centerline establishes the axis of the workpiece 88 for which the steady rest 10 and the grinding machine or lathe (not shown) are originally set. The steady rest 10 is mounted to the grinding machine or lathe with mounting bolts (not shown) inserted through a number of mounting holes 25 located in a mounting flange 23 extending from the bottom wall 26 of the steady rest 10. When stroked by the stroking device 84, the center workpiece contact member 50 and each of the first and second side workpiece contact members 74 and 76 converge at an equal rate toward a convergence point during movement of the cam rollers 78 and 80 through the transverse portions 40 and 42 of the camming contours 32 and 34. By properly positioning the steady rest 10, the convergence point can be readily made to coincide with the static centerline 86a of the workpiece 88 for achieving a desired three-point contact.

Thereafter, the workpiece 88 is ground or machined until, according to the original setting, the required diameter is obtained. The workpiece 88 is then removed and the diameter checked with an off-line gauge (not shown). As previously noted, the dynamic working centerline 86b may not, and typically does not, coincide with the static centerline 86a originally established for the workpiece 88. Whether an oversize or undersize condition results, an adjustment in the position of the steady rest 10 relative to the workpiece 88 can be made by rotating the adjustment screw 98 inwardly or outwardly of the adjustment block 97. In doing so, the control arms 72 and 73 rotate about their respective lower pivot pins 94a and 94b, thereby urging their respective guide plates 28 and 30 toward or away from the workpiece 88. As the guide plates 28 and 30 are displaced, the camming contours 32 and 34 are also displaced, changing the point at which the first and second support arms 60 and 62 first begin to converge towards the workpiece 88.

As shown in FIG. 5, the result is that the convergence point, as defined by the three-point contact of the center and side workpiece contact members 50, 74 and 76, is shifted until it coincides with the dynamic working centerline 86b of the workpiece 88. As previously noted, the microfeed apparatus control knob 99 for the adjustment screw 98 is provided with graduation marks 89 which can be used by an operator to accurately determine the extent to which the centerline 86a of the workpiece 88 is shifted, as dictated by the three-point contact of the center and side workpiece contact members 50, 74 and 76. As the steady rest 10 has been described above, adjustments of as little as 0.00008 inches are readily obtainable.

The advantages provided by the internal centerline adjustment mechanism of the present invention can now be appreciated. With a prior art steady rest, it would be necessary to reposition the steady rest many times relative to the workpiece 88, in order to adjust the axis of the workpiece 88 to find its dynamic working centerline, 86b. In contrast, the steady rest 10 of the present invention can be adjusted simply by rotating the micro-feed apparatus adjustment screw 98 to the extent necessary to compensate for the measured diameter error, determined when the workpiece 88 is checked with an off-line gauge.

A second embodiment of the invention is shown in FIGS. 16–21 and comprises a steady rest, generally designated by the reference numeral 110, which is shown as having essentially the identical construction of the first embodiment 10. The parts of the steady rest 110 which are the same as the parts of the steady rest 10 of the first embodiment have been marked with the same reference numerals preceded by the numeral "1".

Figure 16:
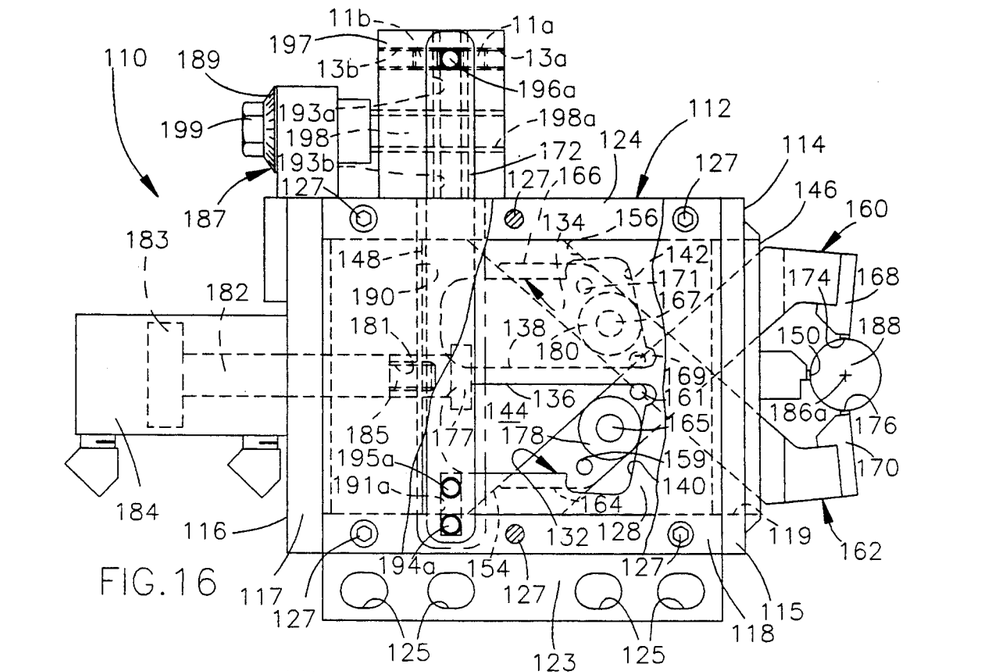
FIG. 16 is a front elevation view, with parts in section and parts broken away, of a steady rest having an internal centerline adjustment mechanism in accordance with a second embodiment of the invention.
Figure 17:
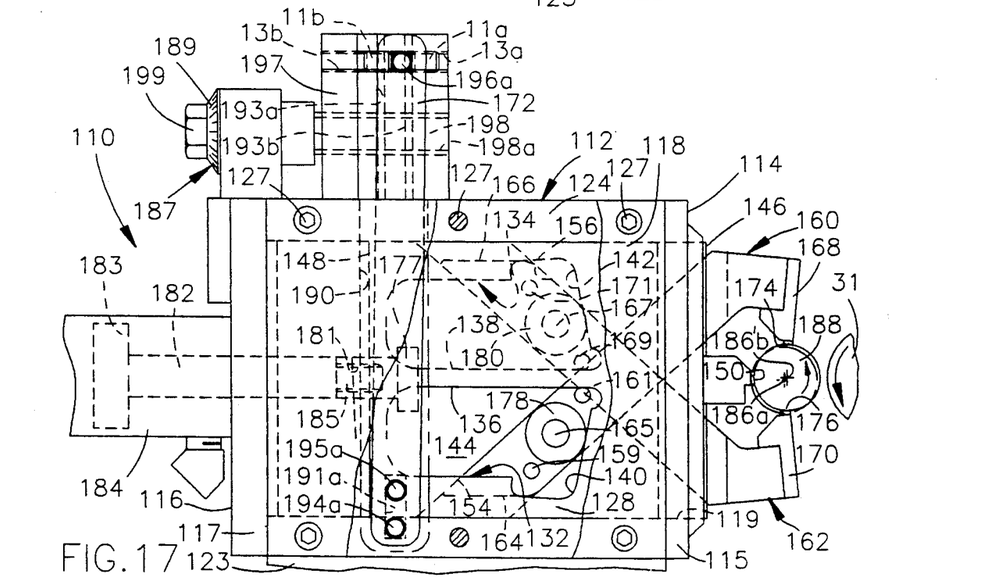
FIG. 17 is a front elevation view of the steady rest illustrated in FIG. 16, and wherein an adjustment has been made to accommodate the dynamic working centerline of a workpiece.
Figure 18:
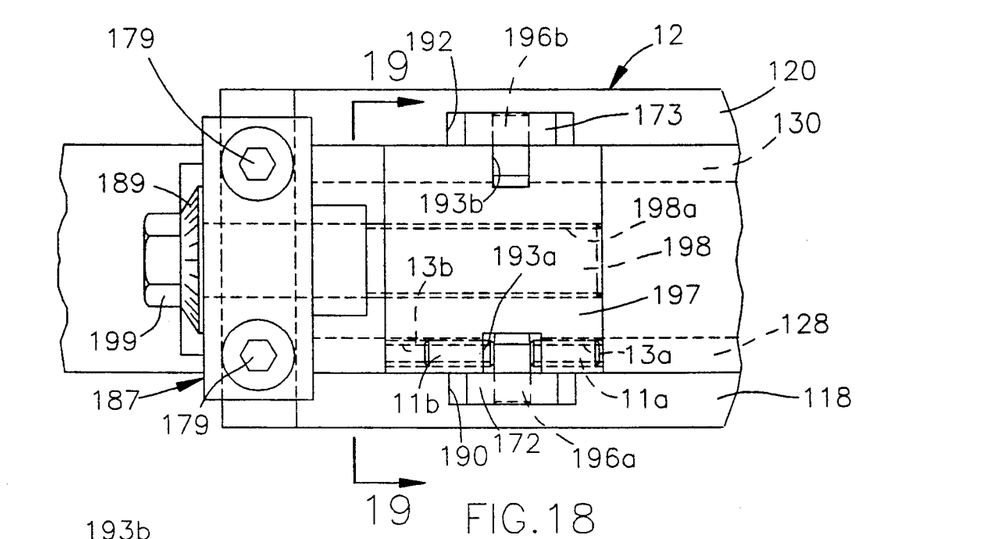
FIG. 18 is a fragmentary top plan view of the microfeed adjuster apparatus shown on the steady rest illustrated in FIG. 16.
Figure 19:
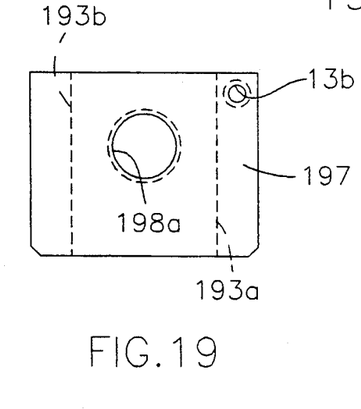
FIG. 19 is a left side elevation view of the adjustment block illustrated in FIG. 18, taken along the line 19—19 thereof, and looking in the direction of the arrows.
Figure 20:
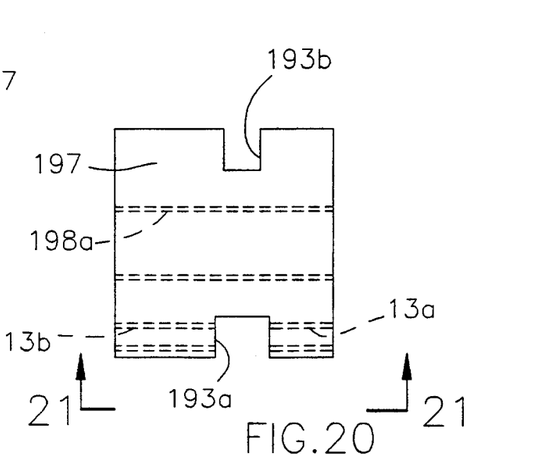
FIG. 20 is a top plan view of the adjustment block illustrated in FIG. 18, shown with parts removed.
Figure 21:
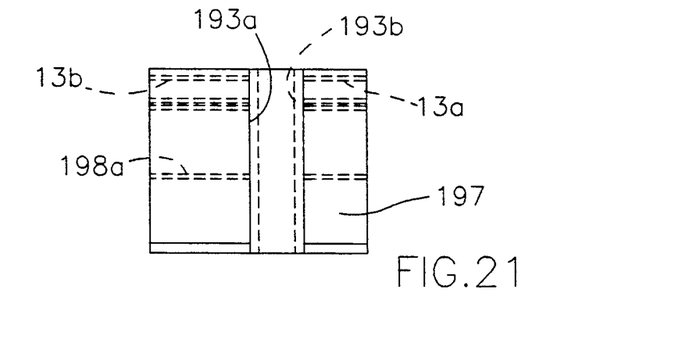
FIG. 21 is a side elevation view of the adjustment block shown in FIG. 20, taken along the line 21—21 thereof, and looking in the direction of the arrows.

The steady rest 110 differs from the steady rest 10 of the first embodiment by the addition of a pair of control arm adjusting screws 11a and 11b, as illustrated in FIGS. 16–18 in the adjustment block 197. As best seen in FIGS. 20 and 21, the pivot pin slot 193a in the adjustment block 197 is wider than the opposite pivot pin slot 193b. A first longitudinal threaded bore 13a is formed in the adjustment block 197 on one side of the wider pivot pin slot 193a, and it communicates with the pivot pin slot 193a. A second longitudinal threaded bore 13b is formed in the adjustment block 197 on the other side of the pivot pin slot 193a, in alignment with the threaded bore 13a, and in communication with the pivot pin slot 193a. Threadably mounted in the threaded bores 13a and 13b are a pair of control arm adjustment screws 11a and 11b for adjusting the position of the control arm 172 forwardly and backwardly, relative to the position of the control arm 173. The inner ends of the control arm adjustment screws 11a and 11b engage the pivot pin 196a for adjusting said pivot pin 196a and the upper control arm 172, in which the pivot pin 196a is press fitted, independently from the lower control arm 173. This action provides the added feature of allowing independent adjustment of the first control arm 172 relative to the second control arm 173 (FIG. 18).

It will be seen, that by adjusting only the control arm 172, and thus shifting only the guide plate 128 toward (as shown in FIG. 17) or away from the workpiece 188, the steady rest 110 can be adjusted to accommodate an offset shift in the dynamic working centerline. As illustrated in FIG. 17, the need for such adjustment may occur due to a resultant force created by the grinding wheel 31, rotating counter-clockwise while a workpiece 188 is also rotated counter-clockwise during a grinding operation. The resultant force will generally urge the workpiece 188 in a direction downward and to the left to move the centerline to a position marked 186'a.

The guide plate 128 can be adjusted forwardly to a new position by adjusting the adjustment screws 11a and 11b to pivot the control arm 172 forwardly (clockwise as viewed in FIG. 17). With the guide plate 128 in the new position, the lower support arm 162 with its workpiece contact member 176 and the center workpiece contact member 150 will come to center before the upper support arm 160 and its workpiece contact member 174. As a result, the workpiece centerline is actually lifted and pushed toward the grinding wheel 31, from the offset centerline 186'a, back to the dynamic working centerline 186b shown in FIG. 17. Accordingly, with the use of the set screws 11a and 11b, the steady rest 110 of the second embodiment can be adjusted to find the dynamic working centerline 186b, which not only varies in a direction toward or away from the workpiece 188, but also in directions oblique to the longitudinal axis of the steady rest 110.

Figure 22:
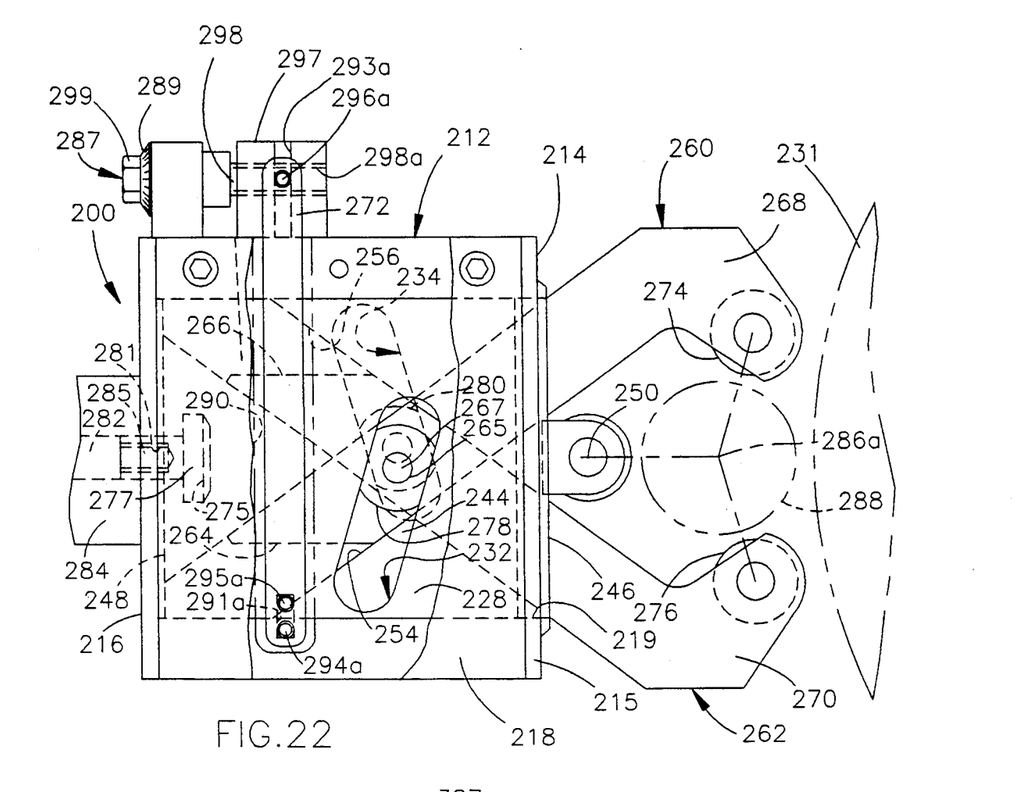
FIG. 22 is a front elevation view, with parts in section and parts broken away, of a steady rest having an internal centerline adjustment mechanism in accordance with a third embodiment of this invention.

A third embodiment of the invention is shown in FIG. 22 and comprises a steady rest, generally designated by the reference numeral 210, which is constructed substantially the same as the steady rest 10 of the first embodiment of FIGS. 1-15. The parts of the steady rest 210 which are the same as the parts of the steady rests 10 and 110, of the first and second embodiments, have been marked with the same reference numerals preceded by the numeral "2". The third embodiment differs with respect to the first embodiment in that the center and side workpiece contact members 250, 270 and 276 comprise rollers instead of hardened contact pads. In addition, the camming contours 232 and 234 lack the longitudinal portions 36 and 38 of the first embodiment camming contours 32 and 34, respectively. Accordingly, the support arms 260 and 262 begin to converge toward the workpiece 288 immediately upon the operator body 244 being displaced toward the workpiece 288.

The third embodiment steady rest 210 is constructed and functions substantially the same as the steady rest illustrated in FIG. 14 of the Lessway U.S. Pat. No. 4,399,639, and the description and operation thereof is incorporated herein by reference. The operator body 248 is shown in a retracted position with the support arms 260 and 262 in a retracted open position. When the operator body 244 is advanced, the support arms 260 and 262 are moved inwardly and the workpiece contact rollers 274 and 276 engage the workpiece 288 simultaneously with the center workpiece contact roller 250 to hold the workpiece 288 on the static centerline 286a. The inward movements of the support arms 260 and 262 are effected by the guide members 278 and 280 sliding in the camming contours 232 and 234, respectively, when the operator body 244 is moved forwardly from the retracted position shown in FIG. 22. A reverse movement of the operator body 244 retracts the support arms 260 and 262 back to the position shown in FIG. 22. The guide members 278 and 280 have straight sides and slide in the camming contours 232 and 234, and they are pivotally mounted by suitable dowel pins 265 and 267 secured on their respective support arms 260 and 262.

Figure 23:
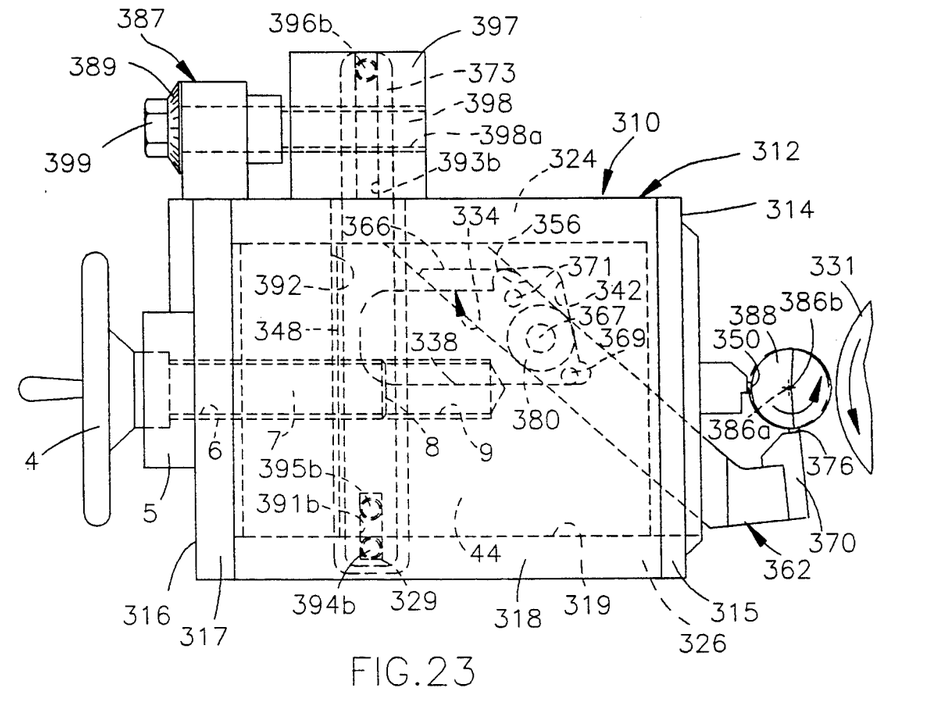
FIG. 23 is a front elevation view, with parts in section and parts broken away, of a steady rest having an internal centerline adjustment mechanism in accordance with a fourth embodiment of this invention.
Figure 24:
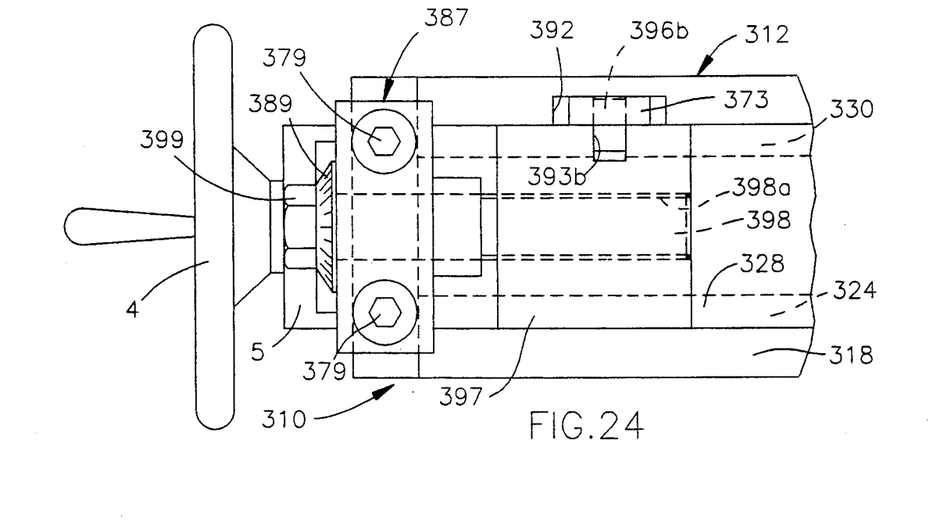
FIG. 24 is a fragmentary top plan view of the steady rest illustrated in FIG. 23.
Figure 25:
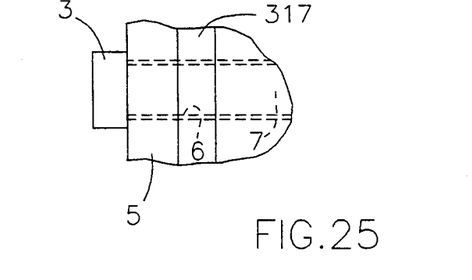
FIG. 25 is a fragmentary view of an electrical power actuator for stroking the steady rest operator body.

A fourth embodiment of the invention is shown in FIGS. 23 and 24 and comprises a steady rest, generally designated by the numeral 310, which is shown as having essentially the identical construction of the first embodiment steady rest 10. The parts of the steady rest 310 which are the same as the parts of the steady rest 10 of the first embodiment have been marked with the same reference numerals preceded by the numeral "3".

The fourth embodiment steady rest 310 differs from the first embodiment steady rest 10 in that it has only a lower support arm 362 which coacts with a center workpiece contact member 350 to provide a two-point centering contact with a workpiece 388. As shown in FIGS. 23 and 24, only one control lever 373 is employed for adjusting the one guide plate 330 (FIG. 24). The guide plate 330 controls the forward and rearward adjustment of the lower support arm 362, in the same manner as the operation of the lower support arm is controlled by the guide plate 30 of the steady rest 10 of the first embodiment. As shown in FIG. 24, a guide plate 328 is employed, but it is not provided with any camming contour, and it maintains the spacing of the operator body 344 in the housing 312, in the same manner as the guide plates 28 and 30 function in the steady rest 10 of the first embodiment.

In the steady rest 310, the operator body 344 is adjustable forwardly and backwardly (FIG. 23) by a manually operated apparatus, which includes a threaded axial bore 9 extending inwardly from the rear end 348 of the operator body 344. Threadably mounted in the operator body threaded bore 9 is a manual adjustment screw 7, the inner end of which is indicated by the numeral 8. The manual adjustment screw 7 extends through a suitable opening 6 formed through the housing rear wall 317 and into a mounting block member 5 that is carried on the outer side of the housing rear wall 317. A hand crank 4 is operatively connected to the outer end of the manual adjustment screw 7. The outer end of the manual adjustment screw 7 is rotatably mounted in the mounting block member 5 but is restrained against axial movement. It will be seen that rotation of the hand crank 4 in the proper direction is operative to move the operator body 344 forwardly or backwardly. When the operator body 344 is moved forwardly by the last described manual adjustment operator body adjustment apparatus, the center contact member 350 is positioned so as to cooperate with the lower support arm 362 to hold the workpiece 388 on a static workpiece centerline 386a. The guide plate 330 may be adjusted by the adjustment screw 398 of the micro-feed adjustment apparatus 387 for adjusting the workpiece 388 to a position where it is on a dynamic working centerline 386b. It will be seen that the steady rest 310 of the fourth embodiment provides a multi-point centering steady rest having a two-point centering structure in accordance with the present invention.

A significant advantage of the present invention is that adjustments can be made to a steady rest of the present invention to find the dynamic working centerline 86b of a workpiece 88 without resorting to loosening and physically repositioning the steady rest relative to a grinding machine or lathe. As a result, significant downtime otherwise required to adjust and remeasure the steady rest's position is avoided. The adjustment is made within the steady rest itself, and there is no need to reposition the steady rest relative to a workpiece 88 or a grinding machine or lathe.

Another significant advantage is that the internal centerline adjustment mechanism can be calibrated to provide minute and controlled adjustments relative to a workpiece 88. By measuring the diameter of a first workpiece 88, an adjustment can be made that corresponds very accurately to the error by which the first workpiece 88 was produced. Accordingly, scrap rates are reduced, in that the number of attempts necessary to determine the dynamic working centerline 86b of the workpiece 88 is significantly reduced. In cooperation with the automatic multi-point centering capability of the present invention, manufacturing tolerances can be more quickly and accurately achieved, with reduced downtime and scrap rates.

While the invention has been described in terms of four embodiments, it is apparent that other forms could be adopted by one skilled in the art. One example would be to provide alternative camming contours 32 and 34. In addition, remote gauging could be employed to monitor the diameter of a workpiece 88 as it is being ground or machined, as taught by the U.S. Pat. No. 5,058,468 to Leesway. Accordingly, the scope of the invention is to be limited only by the following claims.

The guide rollers 78, and 80, the fixed sets of guide pins 59,61 and 69,71, and the guide members 278 and 280 are defined in some of the following claims as cam follower means.

What is claimed is:

1. A method for adjusting a true centering steady rest (10,110,210,310) having a multi-point support structure (50,74,76) in which a point of convergence of said multi-point support structure (50,74,76) is adjusted to correspond with a rotational dynamic working centerline (86b) of a cylindrical workpiece (88), said method comprising the steps of:

determining a static centerline (86a) of said cylindrical workpiece (88);

positioning said steady rest (10,110,210,310) such that said convergence point of said multi-point support structure (50,74,76) coincides with said static centerline (86a);

grinding said workpiece (88);

gauging the ground workpiece (88) to determine its ground diameter; and, adjusting said steady rest (10,110,210,310) to correct for an error between said ground diameter of said workpiece (88) and a desired diameter for said workpiece (88), said adjusting to correct for said error altering said convergence point of said multi-point structure point (50,74,76) to coincide with said rotational dynamic working centerline (86b) of said workpiece (88).

2. A method for adjusting a true centering steady rest (10,110,210,310) according to claim 1, wherein:

said adjusting of said steady rest includes displacing at least one of a pair of camming means (32,34) within said steady rest (110).

3. A method for adjusting a true centering steady rest (10,110,210,310) according to claim 2, wherein:

(a) said adjusting of said steady rest includes pivoting at least one of a pair of control arms (72,73) to displace at least one of a pair of camming means (32,34) within said steady rest (110).

* * * * *